United States Patent
Mirtorabi et al.

(10) Patent No.: US 7,701,875 B2
(45) Date of Patent: Apr. 20, 2010

(54) OSPF UNIDIRECTIONAL LINK SUPPORT FOR UNIDIRECTIONAL RETURN PATHS

(75) Inventors: Sina Mirtorabi, Santa Clara, CA (US); Abhay Roy, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 782 days.

(21) Appl. No.: 11/211,281

(22) Filed: Aug. 24, 2005

(65) Prior Publication Data

US 2007/0047447 A1    Mar. 1, 2007

(51) Int. Cl.
H04L 12/28 (2006.01)
H04L 12/56 (2006.01)

(52) U.S. Cl. .................. 370/254; 370/351; 370/389; 370/392

(58) Field of Classification Search .................. 370/238, 370/254, 255, 355, 356, 395.3, 395.42
See application file for complete search history.

(56) References Cited

U.S. PATENT DOCUMENTS

| | | | |
|---|---|---|---|
| 6,483,833 B1 * | 11/2002 | Jagannath et al. ........... | 370/392 |
| 6,804,776 B1 * | 10/2004 | Lothberg et al. ............ | 713/160 |
| 6,914,914 B1 * | 7/2005 | Flood et al. ................. | 370/503 |
| 6,970,473 B1 * | 11/2005 | Hara et al. .................. | 370/401 |
| 2004/0143842 A1 * | 7/2004 | Joshi .......................... | 725/32 |

OTHER PUBLICATIONS

J. Moy, RFC 2328—OSPF Version 2, Apr. 1998, The Internet Society, pp. 49, 72-74, 78-80.*
R. Coltun, RFC 2370—The OSPF Opaque LSA Option, Jul. 1998, Fore Systems, p. 5.*

* cited by examiner

*Primary Examiner*—Chirag G Shah
*Assistant Examiner*—Ashley L Shivers
(74) *Attorney, Agent, or Firm*—Cesari and McKenna, LLP

(57) ABSTRACT

A method of supporting a unidirectional link from a first router to a second router, the first and second routers existing in an area of a communication network, the method comprising: the second router receiving a hello packet from the first router; the second router determining that its topology information for the communication network is incomplete; the second router encapsulating an open shortest path first (OSPF) packet into an Opaque link state advertisement (LSA); and the second router flooding the Opaque LSA over the area.

21 Claims, 2 Drawing Sheets

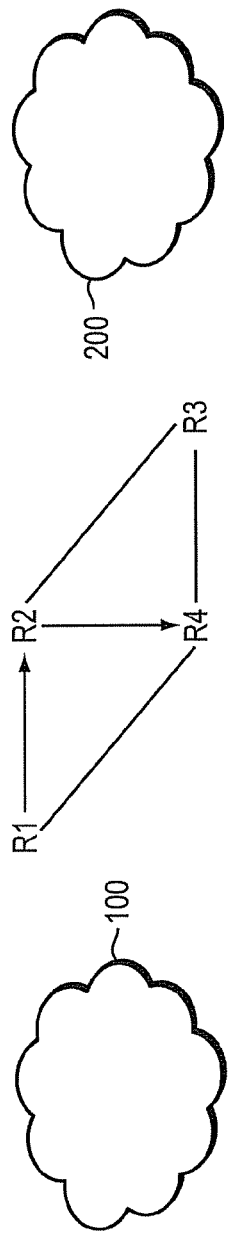
FIG. 1
FIG. 2
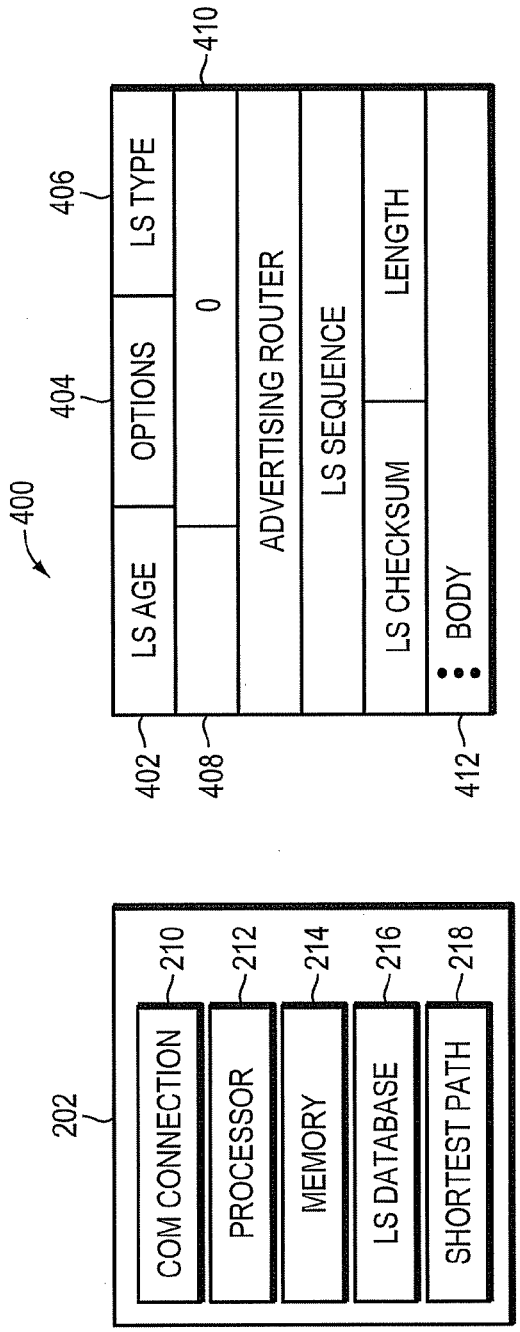
FIG. 4

OSPF UNIDIRECTIONAL LINK SUPPORT FOR UNIDIRECTIONAL RETURN PATHS

FIELD

The present invention relates broadly to communication networks utilizing routers. Specifically, the present invention relates to utilizing packet flooding to compensate for failed links within the communication network.

BACKGROUND

Open Shortest Path First (OSPF) is a routing protocol developed for Internet Protocol (IP) networks. OSPF is a link-state routing protocol that calls for the sending of link-state advertisements (LSAs) to all other routers within the same hierarchical area. Information on attached interfaces, metrics used, and other variables, is included in OSPF LSAs. As OSPF routers accumulate link-state information, they use algorithms that calculate the shortest path to various routers (network nodes). The largest entity within the hierarchy is an autonomous system (AS), which is a collection of networks under a common administration that share a common routing strategy. OSPF is an intra-AS (interior gateway) routing protocol, although it is capable of receiving routes from and sending routes to other ASs. An AS can be divided into a number of areas—groups of contiguous networks and attached hosts. Routers with multiple interfaces can participate in multiple areas. These routers, which are called Area Border Routers, maintain separate topological databases for each area. A topological database is essentially an overall picture of networks in relationship to routers. The topological database contains the collection of LSAs received from all routers in the same area. Because routers within the same area share the same information, they have identical topological databases.

The Shortest Path First (SPF) routing algorithm is the basis for OSPF operations. When a router using the SPF algorithm is powered up, it initializes its routing-protocol data structures and then waits for indications from lower-layer protocols that its interfaces are functional. After a router is assured that its interfaces are functioning, it uses the OSPF Hello protocol to acquire neighbors, which are routers with interfaces to a common network. The router sends hello packets to its neighbors and receives their hello packets. In addition to helping acquire neighbors, hello packets also act as "keepalives," messages that let routers know that other routers are still functional. On multi-access networks (networks supporting more than two routers), the Hello protocol elects a designated router and a backup designated router. Among other things, the designated router is responsible for generating LSAs for the entire multi-access network. Designated routers allow a reduction in network traffic and in the size of the topological database.

When the topological databases of two neighboring routers are synchronized, the routers are said to be adjacent or collectively form an adjacency. Adjacencies control the distribution of routing-protocol packets, which are sent and received only on adjacencies. Each router periodically sends its LSAs to provide information on a router's adjacencies or to inform others when a router's state changes. By comparing established adjacencies to link states, failed routers can be detected quickly, and the network's topology can be altered appropriately. From the topological database generated from LSAs, each router calculates a shortest-path tree (SPT), with itself as root. The SPT, in turn, yields a routing table.

There are network deployments where a communication link between routers can be only unidirectional (UD) and there is a requirement for routing protocols to forward traffic over it. Routing protocols such as OSPF and ISIS can be extended in order to run directly over UD links.

One of the assumptions for support of a UD link from point A to point B is that there is an alternative path from B to A so that a control packet could follow the alternative path. If the alternative path is bidirectional then the flooding over UD link is unnecessary as the alternative path assures the flooding between A and B. However, this assumption may not always be true or upon link failure the topology could consist of an alternative path that contains unidirectional links. What is needed is a mechanism to be able to flood updates over UD links.

Opaque LSAs belong to a class of link-state advertisement used as a generalized mechanism to enable OSPF extensions. Opaque LSAs include typically an LSA header followed by a 32-bit aligned application-specific information field. Like other LSAs, an opaque LSA uses a LS-database distribution mechanism that allows and defines flooding information throughout the domain.

SUMMARY

As referred to herein, a send-only interface of a unidirectional link is an interface that can only transmit and not receive. A receive-only interface of a unidirectional link is an interface that can only receive. Since topology information during the bootstrap cannot be relied upon to route packet from a receive-only interface to a send-only interface as there may be no bidirectional alternative path, flooding is used to deliver the control packet from the receive-only interface to the send-only interface. The present invention utilizes a special opaque LSA with area scope flooding as a container in order to deliver OSPF control packet from the receive-only interface to the send-only interface. Embodiments of the present invention use flooding (if there is no topology information) to deliver the routing protocol packets. This is performed by encapsulating an OSPF control packet into an Opaque LSA and flooding the Opaque LSA through the whole area.

BRIEF DESCRIPTION OF THE DRAWINGS

FIG. 1 illustrates a network of routers in accordance with the present invention;

FIG. 2 illustrates in block diagram form the major components of a router in accordance with the present invention;

FIG. 4 illustrates in block diagram form the organization of an opaque LSA used in accordance with the present invention.

DETAILED DESCRIPTION

Figures 3A, 3B:
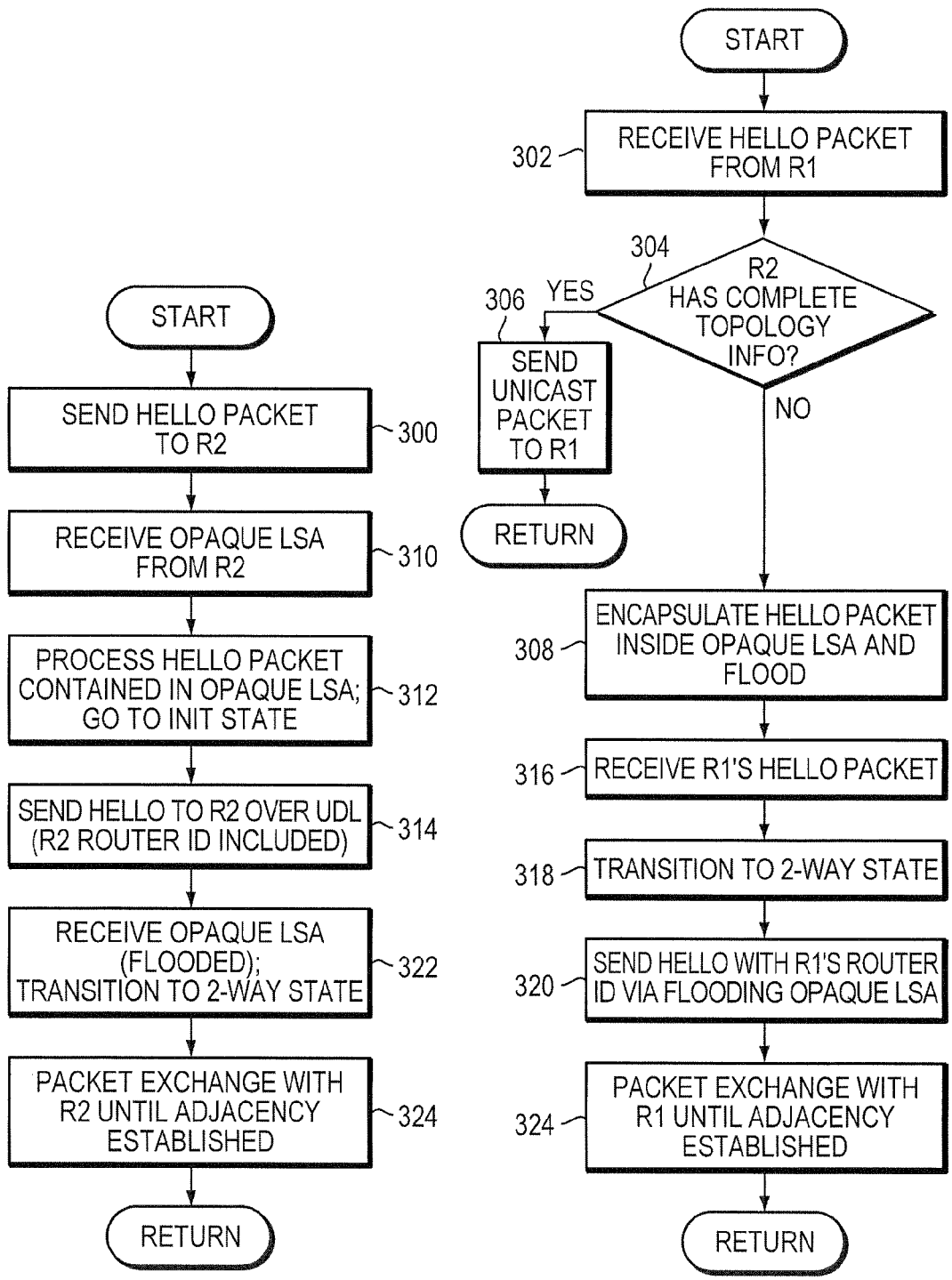
FIG. 3A illustrates in flowchart form acts that are performed in accordance with the present invention on a first server in communication with a second server.
FIG. 3B illustrates in flowchart form acts that are performed in accordance with the present invention on a second server in communication with the server executing the acts in FIG. 3A.

Directing attention to FIG. 1, there is shown an exemplary network of routers in accordance with the present invention. Routers R1-R4 function to pass traffic in the form of packetized data between points 100, 200. Points 100, 200 can be individual, end user computer systems, local area networks, wider area networks, and may even be separate computer networks containing additional routers, but in each case data packets are sent through at least some of the routers R1-R4 between points 100, 200. While FIG. 1 illustrates a network having a specific number of routers R1-R4, it is to be understood that various configurations of routers can be implemented in accordance with the present invention. Such variations include the number of routers included, as well as the communication medium employed between the routers. Routers R1-R4 can communicate with each other over wireless media as well as wired media, as can points 100, 200.

FIG. 2 illustrates an exemplary embodiment of at least one of routers R1-R4 that incorporate the functionality of FIG. 3. Router 202 includes communication connection 210, processor 212, memory 214, link state database 216, and shortest path data structure 218. Other components, commonly found in routers known to those skilled in the art, are included in router 202, but are not illustrated.

The present invention utilizes a special opaque LSA with area scope flooding as a container in order to deliver OSPF control packet from the receive-only interface to the send-only interface. Embodiments of the present invention use flooding (if there is no topology information) to deliver the routing protocol packets. This is done by encapsulating an OSPF control packet into an Opaque LSA that is flooded in the whole area. While the present invention is implemented in OSPF for a more generalized and flexible unidirectional link support, because the preferred embodiment implements the functionality of the present invention through software, the present invention can be implemented on a wide variety of platforms which can support a unidirectional link.

The present invention removes the restrictions in supporting unidirectional links such that the return path isn't required to be bidirectional. Thus, the present invention allows for more flexible usage of unidirectional links in a network deployment.

To better explain the present invention, assume that links R1->R2 and R2->R4 are UD links and there is a link failure between router R2 and router R3. There is an alternative bidirectional path from router R2 to router R1, namely R2->R3->R4->R1. There is also an alternative path from router R4 to router R2, namely R4->R3->R2. Given failed link R2->R3, the alternative bidirectional path R2->R1 as well as R4->R2 is broken. Therefore, there is a need to flood over unidirectional links as otherwise only a subset of topologies could be supported for a unidirectional link. In order to send OSPF control packets over alternative paths, a route to a remote neighbor's IP address should be available in order to forward correctly the packet to the remote node. However, such a path might not be available. Considering the same topology where link R2->R3 failed, in order to flood over link R2-R1, a path from router R2 to router R1 needs to be available. However, as there is no bidirectional path from router R2 to router R1, there is no route to the remote neighbor IP address. Adjacencies are necessary for flooding, and to establish adjacencies, topology information is required.

Directing attention to FIGS. 3A and 3B, operations are executed by routers R1 and R2, respectively. These operations can be stored as software commands routers R1, R2, or can be implemented on routers R1, R2 through circuitry. While the acts executed in FIGS. 3A and 3B appear sequential as illustrated, it is to be understood that the individual acts shown in FIG. 3A do not have to execute immediately upon completion of a proceeding act; thus delays between acts can be affected by the timing of execution of the acts illustrated in FIG. 3B. Likewise, delays within the sequence of acts shown in FIG. 3B can occur until one or more acts are completed as shown in FIG. 3A. At act 300, Router R1 sends a Hello packet to router R2 over a unidirectional link existing between router R1 and router R2. Upon reception of the Hello packet (act 302), if router R2 has a complete topology information (decision step 304), as is the case where there is an alternative bidirectional path from router R2 to router R1, then router R2 has a route to router R1 and sends a unicast packet to router R1 (act 306). Otherwise router R2 encapsulates the Hello within an area scope Opaque LSA and floods it (act 308). Note that router R2 does not have yet any adjacency and simply flood this LSA out of its unidirectional link. This LSA is the only LSA that will be flooded over the unidirectional link (during the bootstrap) without having an adjacency. No acknowledgement or indication is required over the unidirectional link for this special opaque LSA. Once the Opaque LSA reaches router R1 (act 310), router R1 processes the Hello packet within the Opaque LSA and goes into Init (act 312). Router R1 sends a Hello to router R2 over the UD link from router R1 to router R2, including router R2's router ID (act 314). Upon reception of router R1's Hello (act 316), router R2 goes into 2WAY (act 318) and sends a Hello including router R1's Router ID via the same Opaque LSA flooding (act 320). Once router R1 gets the packet and goes to 2WAY normal DD exchange take place (act 322). Normal OSPF packet exchanges occur between router R1 and router R2 until they become fully adjacent (acts 324). Note that router R1 control packets are sent directly via a unidirectional link and router R2's control packets follow a flooding path.

Executing concurrently, and, in the preferred embodiment, unsynchronized with respect to router pair (R1 R2) as applied to router pair (3 and 4), acts 300-324 described above also are used by routers to manipulate the unidirectional link from router R2 to router R4. The explanation above for acts 300-324 applies herein, with R2 substituted in the reference text for R1 and R4 substituted for R2.

Acts 300-324 described above are executed between router R2 and router R4 concurrently or nearly concurrently, and, in the preferred embodiment, execution of acts 300-324 between router pair R1,R2 are not synchronized with the execution of acts 300-324 between router pair R2,R4. By executing acts 300-324, routers R2, R4 manipulate the unidirectional link from router R2 to router R4. The explanation above for acts 300-324 applies herein, with R2 substituted in the reference text for R1 and R4 substituted for R2.

FIG. 4 illustrates organization of a portion of an exemplary opaque LSA that is used for flooding in the preferred embodiment of the present invention. Typically, opaque LSA 400 is a UCP-LSA defined as an area-scope opaque LSA with LSA type 10 and includes link state age 402, options information 404, and link state type information 406. Opaque type 408 in the LSA header is TBD and Opaque ID 410 is set to zero. Body 412 of opaque LSA 400 carries the OSPF control packets.

While preferred embodiments of the present invention have been described and illustrated in detail, it is to be understood that many modifications can be made to embodiments of the present invention without departing from the spirit thereof.

What is claimed is:

1. A method of supporting a unidirectional link from a first router to a second router, the first and second routers existing in an area of a communication network, the method comprising:

the second router receiving a hello packet from the first router over the unidirectional link;

the second router determining that there is no operational bidirectional alternative path from the second router to the first router;

the second router encapsulating an open shortest path first (OSPF) packet into an Opaque link state advertisement (LSA) in response to the second router determining that there is no operational bidirectional alternative path from the second router to the first router; and the second router flooding the Opaque LSA over the area to use one or more other unidirectional links to reach the first router.

2. The method of claim 1, further comprising, as the result of the flooding the Opaque LSA, the second router:

receiving a hello packet from the first router;

detecting in the received hello packet a router identifier, the router identifier identifying the second router; and transitioning to a 2-way state.

3. The method of claim 2, further comprising the second router flooding an Opaque LSA containing a router identifier identifying the first router.

4. The method of claim 3, further comprising the second router establishing adjacency with the first router.

5. The method of claim 4, wherein the adjacency is established by the second router performing a database exchange with the first router.

6. A router configured to support a unidirectional link from another router and itself, the routers existing in an area of a communication network, the router executing instructions that cause the router to:

receive a hello packet from the another router over the unidirectional link;

determine that there is no operational bidirectional alternative path from the router to the another router;

encapsulate an open shortest path first (OSPF) packet into an Opaque link state advertisement (LSA) in response to the router determining that there is no operational bidirectional alternative path from the router to the another router; and flood the Opaque LSA over the area to use one or more other unidirectional links to reach the another router.

7. The router of claim 6, further comprising instructions that execute, as the result of the flooding the Opaque LSA, to:

receive a hello packet from the another router;

detect in the received hello packet a router identifier, the router identifier identifying the router; and transition the router to a 2-way state.

8. The router of claim 7, further comprising instructions that execute to flood an Opaque LSA containing a router identifier identifying the another router.

9. The router of claim 8, further comprising instructions that execute to establish adjacency with the another router.

10. The router of claim 9, wherein the instructions that execute to establish adjacency comprise instructions that execute to perform a database exchange with the another router.

11. The method of claim 1, further comprising the second router sending a unicast packet to the first router in response to the second router determining that its topology information for the communication network is complete.

12. The method of claim 1, wherein the opaque LSA is an area-scope opaque LSA.

13. The method of claim 1, wherein the opaque LSA has a LSA type field, a link state age field, an options information field.

14. The method of claim 1, wherein the opaque LSA has a body field that carries the OSPF control packet.

15. The method of claim 1, wherein an opaque ID field of the opaque LSA is set to zero.

16. The router of claim 6, further comprising instructions that execute to send, by the router, a unicast packet to the other router in response to the router determining that its topology information for the communication network is complete.

17. The router of claim 6, wherein the opaque LSA is an area-scope opaque LSA.

18. The router of claim 6, wherein the opaque LSA has a LSA type field, a link state age field, an options information field.

19. The router of claim 6, wherein the opaque LSA has a body field that carries the OSPF packet.

20. The router of claim 6, wherein an opaque ID field of the opaque LSA is set to zero.

21. A system comprising:

means for receiving a hello packet at a second router from a first router over a unidirectional link, the first router and the second router existing in an area of a communication network;

means for determining at the second router that there is no operational bidirectional alternative path from the second router to the first router;

means for encapsulating at the second router an open shortest path first (OSPF) packet into an Opaque link state advertisement (LSA) in response to determining at the second router that there is no operational bidirectional alternative path from the second router to the first router; and means for flooding the Opaque LSA from the second router over the area to use one or more other unidirectional links to reach the first router.

* * * * *